United States Patent
Halladin et al.

(10) Patent No.: US 10,407,247 B2
(45) Date of Patent: Sep. 10, 2019

(54) VIBRATORY CONVEYOR WITH A CONVEYOR TROUGH WHICH IS MADE OF A FLEXIBLE MAT

(71) Applicant: Spaleck GmbH & Co. Kommanditgesellschaft, Bocholt (DE)

(72) Inventors: Jörg Halladin, Bocholt (DE); Frederik Stening, Rosendahl (DE); Christian Lake, Bocholt (DE); Stefan Tetiet, Bocholt (DE)

(73) Assignee: SPALECK GMBH & CO. KOMMANDITGESELLSCHAFT, Bocholt (DE)

( * ) Notice: Subject to any disclaimer, the term of this patent is extended or adjusted under 35 U.S.C. 154(b) by 0 days.

(21) Appl. No.: 16/081,772

(22) PCT Filed: Mar. 1, 2017

(86) PCT No.: PCT/EP2017/054786
§ 371 (c)(1),
(2) Date: Aug. 31, 2018

(87) PCT Pub. No.: WO2017/149021
PCT Pub. Date: Sep. 8, 2017

(65) Prior Publication Data
US 2019/0077607 A1   Mar. 14, 2019

(30) Foreign Application Priority Data

Mar. 3, 2016 (DE) .................. 10 2016 103 803

(51) Int. Cl.
*B65G 27/04* (2006.01)
*B65G 27/08* (2006.01)

(52) U.S. Cl.
CPC .............. *B65G 27/04* (2013.01); *B65G 27/08* (2013.01); *B65G 2812/0324* (2013.01); *B65G 2812/0388* (2013.01); *B65G 2812/0396* (2013.01)

(58) Field of Classification Search
CPC ........ B65G 27/04; B65G 27/06; B65G 27/08; B65G 2812/0324; B65G 2812/0348; B65G 2812/0364; B65G 2812/0384; B65G 2812/0388; B65G 2812/0396; B07B 1/485
USPC ......................................... 198/754, 758, 771
See application file for complete search history.

(56) References Cited

U.S. PATENT DOCUMENTS 4,064,051 A    12/1977  Wehner
4,188,288 A *   2/1980  Wehner .................. B07B 1/485
                                                    209/310
(Continued)

FOREIGN PATENT DOCUMENTS

DE    100 03 172 C1    6/2001
DE    10003172 C1      6/2001
(Continued)

OTHER PUBLICATIONS

PCT Search Report; priority document.
PCT Preliminary Report; priority document.

*Primary Examiner* — Gene O Crawford
*Assistant Examiner* — Keith R Campbell
(74) *Attorney, Agent, or Firm* — Greer, Burns & Crain, Ltd.

(57) ABSTRACT

A vibratory conveyor with a base frame, a vibrating frame mounted on the base frame and is vibrated relative to the base frame by a vibratory drive, and a conveyor trough made of a continuous flexible mat. The flexible mat is alternately connected to the base frame and the vibrating frame at connection points which are mutually spaced when seen in the longitudinal direction of the conveyor trough. A respective mat portion lies between each pair of connection points adjoining each other in the longitudinal direction of the
(Continued)

conveyor trough. The vibrating frame can be vibrated relative to the base frame by means of the vibratory drive, and mat portions adjoining one another in the longitudinal direction of the conveyor trough are thus alternately stretched and slackened in a push-pull mode.

11 Claims, 3 Drawing Sheets

(56) References Cited

U.S. PATENT DOCUMENTS

| | | |
|---|---|---|
| 4,482,046 A | 11/1984 | Kraus |
| 4,787,502 A | 11/1988 | Sullivan |
| 5,375,694 A | 12/1994 | Sanford et al. |
| 7,344,032 B2 * | 3/2008 | LaVeine .............. B07B 1/46 209/310 |
| 7,654,394 B2 * | 2/2010 | LaVeine .............. B07B 1/28 209/310 |
| 8,757,392 B2 * | 6/2014 | LaVeine .............. B07B 1/485 209/319 |
| 2001/0001727 A1 | 8/2001 | Kreft et al. |
| 2001/0017275 A1 | 8/2001 | Kreft et al. |
| 2005/0274653 A1 | 12/2005 | Laveine |
| 2013/0126398 A1 | 5/2013 | Laveine |

FOREIGN PATENT DOCUMENTS

| | | |
|---|---|---|
| EP | 2 835 183 A1 | 2/2015 |
| EP | 2835183 A | 2/2015 |

* cited by examiner

VIBRATORY CONVEYOR WITH A CONVEYOR TROUGH WHICH IS MADE OF A FLEXIBLE MAT

CROSS-REFERENCES TO RELATED APPLICATIONS

This application claims the benefit of the International Application No. PCT/EP2017/054786, filed on Mar. 1, 2017, and of the German patent application No. 10 2016 103 803.2 filed on Mar. 3, 2016, the entire disclosures of which are incorporated herein by way of reference.

BACKGROUND OF THE INVENTION

The present invention relates to a vibratory conveyor having a base frame, having a vibrating frame that can be set into vibratory motion relative to the base frame by a vibratory drive, and having a conveyor trough formed by a flexible continuous mat, the flexible mat forming the conveyor trough being connected alternately to the base frame and to the vibrating frame at connection points that are at a distance from one another, seen in the longitudinal direction of the conveyor trough, a respective mat segment being situated between each two connection points adjacent to one another in the longitudinal direction of the conveyor trough, the vibrating frame being capable of being set into a vibration relative to the base frame by the vibratory drive such that mat segments adjacent to one another in the longitudinal direction of the conveyor trough are alternately tensioned and relaxed in a push-pull mode, the connection points being situated on traverses that run transverse to the longitudinal direction of the conveyor trough at a distance from one another, and each first traverse being connected to the base frame and each second traverse being connected to the vibrating frame respectively, in alternating fashion.

First vibratory conveyors of the type named above are known from US 2013/126398 A1 and from US 2005/274653 A1. These vibratory conveyors have a base frame having a vibrating frame that is mounted on the base frame and that can be set into vibratory movement relative to the base frame by a vibratory drive, and having a conveyor trough formed by a flexible mat, the flexible continuous mat forming the conveyor trough being connected alternately to the base frame and to the vibrating frame at connection points that are at a distance from one another, seen in the longitudinal direction of the conveyor trough, a respective mat segment being situated between each two connection points adjacent to one another in the longitudinal direction of the conveyor trough, and the vibrating frame being capable of being set into a vibratory motion relative to the base frame by the vibratory drive of the vibrating frame such that mat segments adjacent to one another in the longitudinal direction of the conveyor trough are alternately tensioned and relaxed in a push-pull mode.

Another vibratory conveyor is known from U.S. Pat. No. 4,482,046 A. This vibratory conveyor has a continuous flexible conveyor trough that is fixed at its longitudinal edges to the vibrating frame. The vibrating frame is mounted on the base frame by levers and springs, and can be set into vibration by the vibratory drive, whereby the flexible conveyor trough changes its static shape and exerts a conveyor effect on conveyed material situated thereon.

Another vibratory conveyor is known from U.S. Pat. No. 5,375,694 A. This vibratory conveyor has a longitudinally extended membrane as conveyor trough, clamped continuously at its lateral edges in the vibrating frame. The vibrating frame is mounted in the base frame so as to be capable of vibration, and can be set into vibration by the vibratory drive in such a way that standing waves form in the membrane that bring about a conveying of the conveyed material on the membrane.

In practical use of such vibratory conveyors, it has turned out to be a problem that they do not offer the possibility of influencing the distribution of the conveyed material in the conveyor trough. In addition, it is disadvantageous that, depending on the material to be conveyed, a layer of conveyed material forms on the surface of the conveyor trough that is adhesive and that becomes increasingly thicker, which layer increasingly loads the conveyor trough and impairs the conveying effect of the vibratory conveyor. It is therefore necessary to regularly remove the adhering conveyed material layer, which practically can only be done manually, and in each case requires the vibratory conveyor to be shut off.

SUMMARY OF THE INVENTION

For the present invention, an object therefore arises of providing a vibratory conveyor of the type named above in which the possibility exists of influencing the distribution of the conveyed material in the conveyor trough, and in which undesirable adhesions of conveyed material on the conveyor trough surface are prevented, or at least significantly reduced.

According to the present invention, this object is achieved by a vibratory conveyor of the type named above that is characterized in that at least one of the traverses running in the transverse direction of the conveyor trough has a centric height profile, pronounced in the height direction, which forms, in the mat and in the conveyor trough, a distribution contour that here divides the stream of conveyed material on the mat into two lateral partial streams.

In this way, in the vibratory conveyor according to the present invention the advantageous possibility is created of influencing the distribution and/or guiding of the conveyed material in the conveyor trough in a desired manner Advantageously, in the vibratory conveyor according to the present invention, the alternating tensioning and relaxing of the mat segments moreover produces movements and accelerations that provide a prevention, or at least a significant reduction, of the undesirable adhesion of conveyed material, or portions of conveyed material, on the surface of the conveyor trough. At the same time, the produced movements and accelerations of the mat segments achieve an effective conveying of the material to be conveyed. A cleaning of the conveyor trough is therefore no longer required in the vibratory conveyor according to the present invention, or is required only at significantly longer time intervals, which reduces unproductive shutdown times, and increases the profitability of the operation of the vibratory conveyor. Due to the fact that the connection points lie on traverses running transverse to the longitudinal direction of the conveyor trough at a distance from one another, each first traverse being connected to the base frame and each second traverse being connected to the vibrating frame respectively in alternating fashion, the vibratory movement of the vibrating frame is also executed by the second traverses connected thereto, so that there results a desired vibratory movement of the second traverses relative to the first traverses connected to the base frame. In addition, the mat forming the conveyor trough is also supported at its lower side by the traverses, which relieves load on the mat and permits a significantly longer useful life of the mat than in the case of a mat held only at its longitudinal edges.

In addition, it is preferably provided that the vibrating frame is mounted so as to be capable of vibratory movement relative to the base frame in such a way that during the vibratory movement of the vibrating frame produced by the vibratory drive, the distance of the first and second traverses from one another changes periodically. In other words, here the direction of vibration runs in the longitudinal direction of the conveyor trough, thus effectively producing the desired alternating tensioning and relaxing of the mat segments.

In addition, the vibrating frame can be mounted so as to be capable of vibration relative to the base frame in such a way that during the vibratory movement of the vibrating frame produced by the vibratory drive, a periodic change in the height position of the first and second traverses relative to one another is superposed on, or can be superposed on, the periodic change in distance of the first and second traverses from one another. In this way, the conveying effect, e.g. a conveying speed, of the vibratory conveyor can be influenced.

The first and second traverses can be fixedly connected to their respectively associated frame in order to create a particularly stable and long-lasting configuration. Alternatively, the traverses can also be attached detachably to their frame in order to easily be able to exchange them for differently dimensioned or shaped traverses as needed, e.g., when there are changes in the conveying job or properties of the conveyed material.

A desired vibratory direction or vibratory plane can be determined through correspondingly fashioned and oriented springy connecting elements between the base frame and the vibrating frame.

In a further embodiment of the vibratory conveyor, it is proposed that the flexible mat forming the conveyor trough is made continuous over a plurality of, or all, connection points. In this way, a conveyor trough is formed that is steadily continuous over a length encompassing a plurality of connection points, or over its full length.

Alternatively, the mat segments of the flexible mat forming the conveyor trough can be mat partial pieces that are separate and tightly abut one another and each extend between two adjacent connection points. This embodiment offers the advantage that, as needed, individual damaged mat partial pieces can easily be exchanged, and the entire conveyor trough does not have to be replaced.

Preferably, one of the traverses connected to the vibrating frame is situated at a supply end of the vibratory conveyor. In this way, adhesions of the conveyed material at the supply end of the vibratory conveyor, where the conveyed material frequently impacts the conveyor trough with a certain falling speed, are particularly effectively counteracted.

In order to prevent losses of conveyed material during conveying operation in a manner that is technologically as advantageous as possible, it is proposed that the flexible mat forming the conveyor trough be bent upward at its longitudinal edges. This bending up of the longitudinal edges of the mat, or of the mat partial pieces, is easily possible due to its flexibility, and also does not impair the alternating tensioning and relaxing of the mat segments.

In order to achieve a conveying effect, in principle it is sufficient for only the vibrating frame to be set into vibratory motion relative to the base frame, which itself does not vibrate. For many cases of use of the vibratory conveyor, however, it can be functionally advantageous if the base frame is configured so as to be capable of vibratory motion relative to an installation surface of the vibratory conveyor, and the base frame can be set into vibratory motion relative to the installation surface by the vibratory drive of the vibrating frame or by a separate vibratory drive. Thus, here two vibratory motions are superposed. Here, the vibratory motions are usefully coupled with one another in a suitable manner, in particular phase-coupled, in order to ensure an effective conveying of conveyed material.

In order to make it possible to adapt the vibratory conveyor to changing conveying tasks and changing properties of the conveyed material, the/each vibratory drive is usefully adjustable with regard to its vibration frequency and/or vibration amplitude and/or vibration direction. Suitable vibratory drives are known, and can, for example, include rotating or oscillating imbalance masses, or can operate electromagnetically or pneumatically or hydraulically.

In order to further contribute to preventing disturbing adhesion of conveyed material on the conveyor trough surface, the flexible mat forming the conveyor trough is preferably made of a plastic or rubber material that has a coating that is non-adhesive or anti-adhesive with regard to the material to be conveyed.

BRIEF DESCRIPTION OF THE DRAWINGS

In the following, an exemplary embodiment of the vibratory conveyor according to the present invention is explained on the basis of a drawing.

In the following description of the Figures, identical parts in the various Figures are always provided with identical reference characters, so that all reference characters do not have to be explained again for each Figure.

DETAILED DESCRIPTION OF THE PREFERRED EMBODIMENTS

Figure 1:
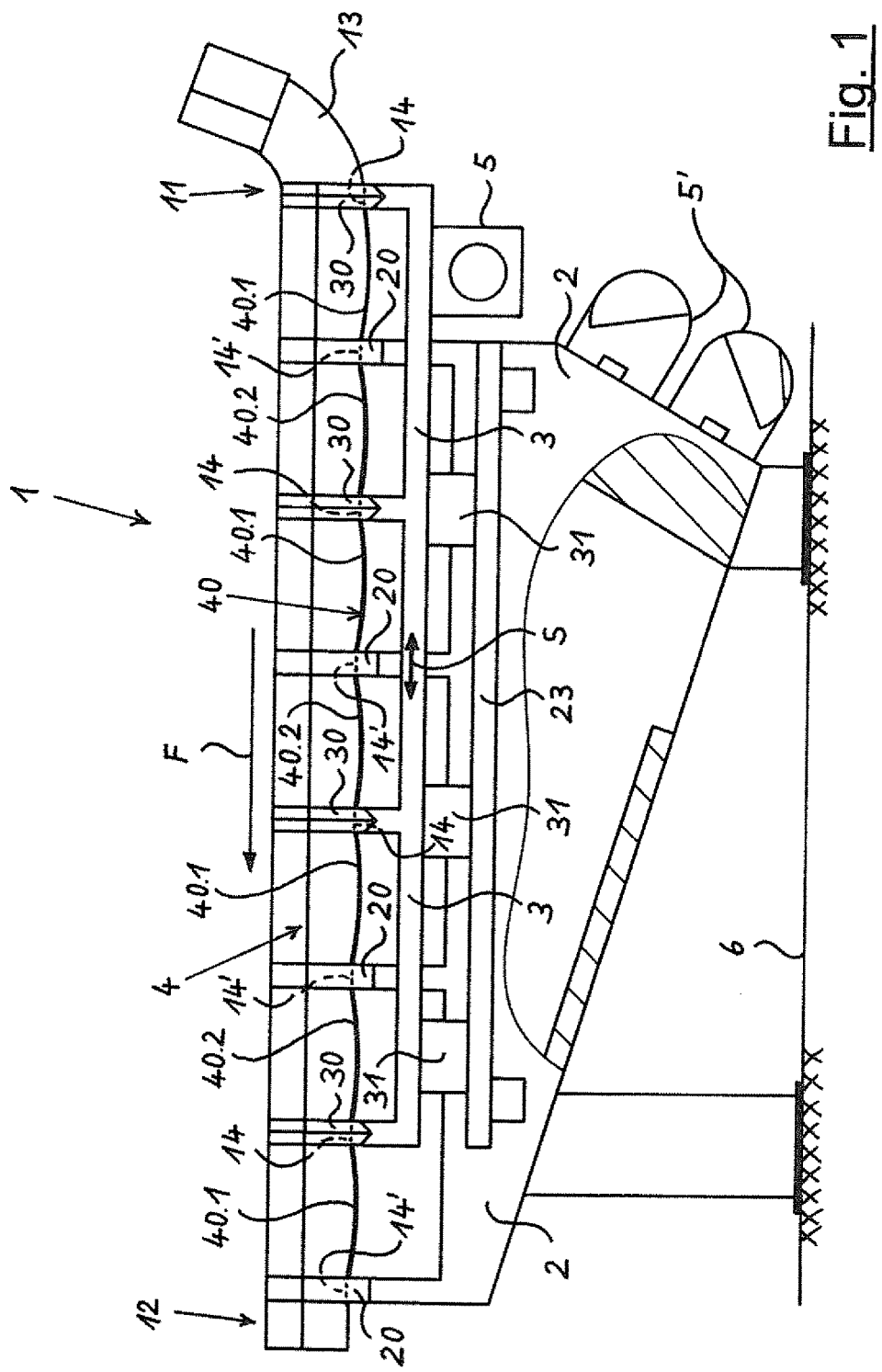
FIG. 1 shows a vibratory conveyor in a schematic side view.

FIG. 1 of the drawing shows a vibratory conveyor 1 in a schematic side view. Vibratory conveyor 1 has a base frame 2 that is situated on an installation surface 6, such as the floor of an operations building. On each of its two longitudinal sides, base frame 2 has a respective console 23 extending in the longitudinal direction of base frame 2, on which console a plurality of spring elements 31 are situated at distances from one another.

On spring elements 31 there is situated a vibrating frame 3 that is capable of vibratory movement relative to base frame 2 in direction of vibration S, indicated by a double arrow. A vibratory drive 5, situated at the end region of vibrating frame 3 at the right in FIG. 1, is used to produce the vibratory movement of vibrating frame 3.

First traverses 20, which run in the transverse direction of base frame 2, are connected to base frame 2, distributed at regular distances in the longitudinal direction of base frame 2. Second traverses 30, also distributed at regular distances in the longitudinal direction of vibrating frame 3, are connected to vibrating frame 3. Second traverses 30 are each situated approximately centrically between two adjacent first traverses 20.

A mat 40 that runs in the longitudinal direction of vibratory conveyor 1 and forms a conveyor trough 4 is connected to first traverses 20 and second traverses 30. Here, connection points 14 are situated on second traverses 30, and connection points 14' are situated on first traverses 20. In this way, a mat segment 40.1 and a mat segment 40.2 is situated between each two adjacent traverses 20, 30 in respectively alternating fashion.

The end of vibratory conveyor 1 at right in FIG. 1 forms its supply end 11, at which material to be conveyed is supplied to conveyor trough 4 of vibratory conveyor 1. At supply end 11, mat 40 can be led further outward and connected to a device that supplies the conveyed material, and can form there a kind of supply chute 13 for the material that is to be conveyed further on vibratory conveyor 1.

The end of vibratory conveyor 1 at left in FIG. 1 forms its delivery end 12, where the material conveyed by vibratory conveyor 1 can be delivered for example to a further conveyor device or to a reservoir or transport container.

During operation of vibratory conveyor 1, vibrating frame 3 is set into a vibrating motion in direction of vibration S relative to base frame 2 by vibratory drive 5. As a result, second traverses 30 are set into a back-and-forth motion relative to first, unmoved traverses 20. This vibrating movement of second traverses 30 ensures that mat segments 40.1, 40.2 are tensioned and relaxed in alternating fashion and in a push-pull mode. This periodic tensioning and relaxing of mat segments 40.1, 40.2 produces movements and accelerations that provide a conveying of conveyed material along conveyor trough 4 in the direction of conveying indicated by arrow F, and that prevent undesirable adhesion of conveyed material on the surface of mat 40.

In a modification of vibratory conveyor 1, in addition its base frame 2 can be configured so as to be capable of vibratory motion relative to installation surface 6, and can then also be set into vibration by a separate vibratory drive 5', in order to amplify the conveying effect of vibratory conveyor 1.

Figure 2:
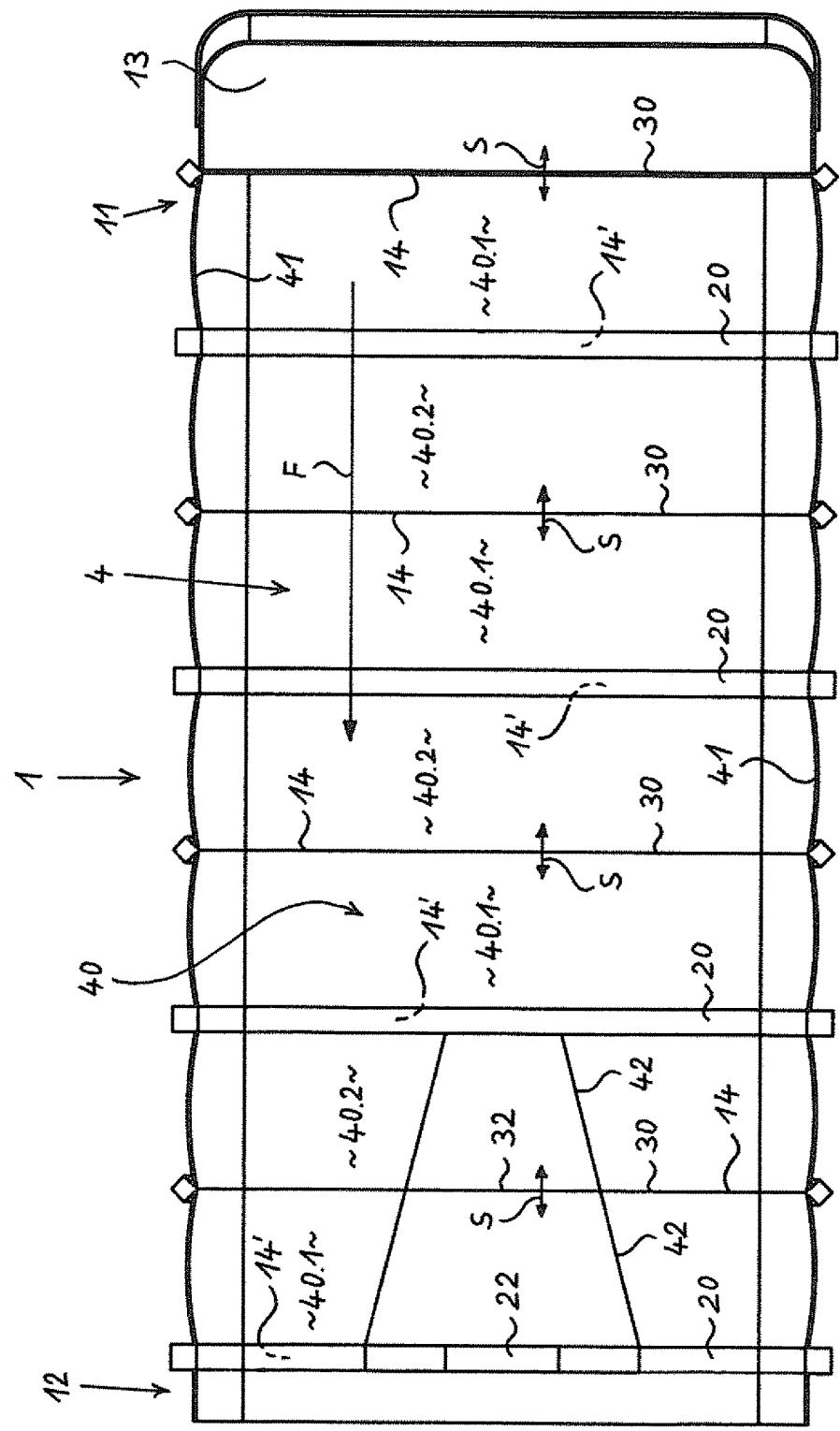
FIG. 2 shows the vibratory conveyor of FIG. 1 in a schematic top view.

FIG. 2 shows vibratory conveyor 1 of FIG. 1 in a schematic top view. At right in FIG. 2 is situated supply end 11 of vibratory conveyor 1, with supply chute 13 formed by led-out segment of mat 40. At left in FIG. 2 is delivery end 12 of vibratory conveyor 1.

Seen in the longitudinal direction and conveying direction F of vibratory conveyor 1, first traverses 20 and second traverses 30 run transverse thereto, in alternating fashion; for their visibility, here mat 40 is shown as "transparent." Respective connection points 14' are situated on first traverses 20, and respective connection points 14 are situated on second traverses 30, at which points mat 40 is connected to the respective traverses 20, 30, advantageously in detachable fashion.

As indicated by the respective double arrow S, during operation of vibratory conveyor 1 second traverses 30 vibrate back and forth in the longitudinal and conveying direction F of vibratory conveyor 1, whereby the distance between first traverses 20 and adjacent second traverses 30 periodically changes. This has the effect that mat segments 40.1, 40.2 are tensioned and relaxed in alternating fashion and in push-pull mode.

In the region of vibratory conveyor 1 at left in FIG. 2, adjacent to delivery end 12, the traverses 20, 30 situated there are fashioned with a height profile 22, 32 running in the longitudinal direction of traverses 20, 30. In the depicted example, traverses 20 and 30 have a raised part in their center region, seen in the longitudinal direction of the transverses, whereby a distribution contour 42 is formed in mat 40 running over traverses 20, 30, and thus in conveyor trough 4.

At top and bottom in FIG. 2, a raised edge 41 of mat 40 is visible, forming a conveyor trough 4 limited at the sides, in order to prevent losses of conveyed material over the lateral edges of mat 40.

Figure 3:
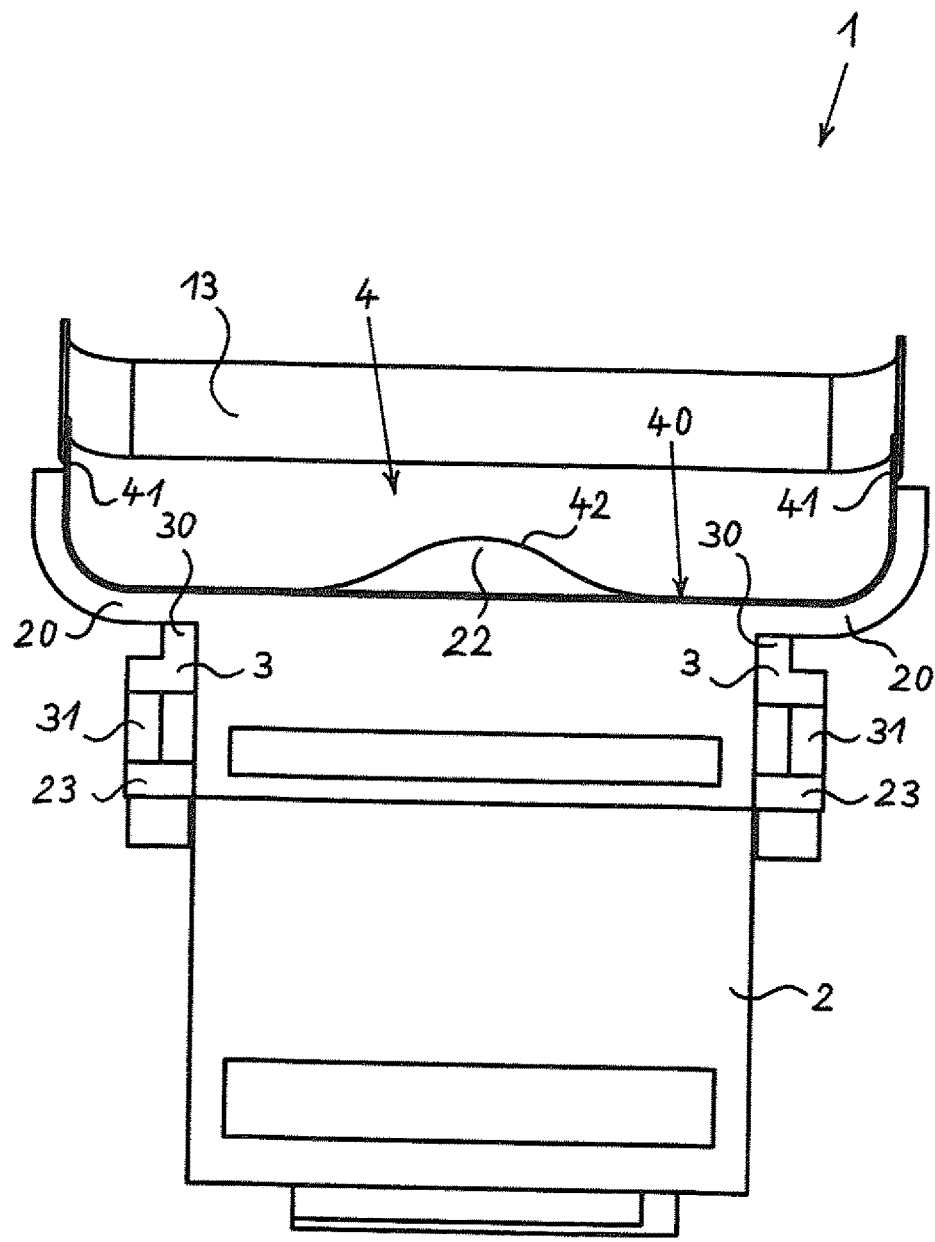
FIG. 3 shows the vibratory conveyor of FIG. 1 in a schematic view of its end face at the left in FIG. 1.

FIG. 3 shows the vibratory conveyor of FIG. 1 in a schematic view of its left end face in FIG. 1. At bottom in FIG. 3, base frame 2 with its lateral consoles 23 is visible. On consoles 23 are seated spring elements 31, on which in turn vibrating frame 3 is placed. Spring elements 32 are here made such that vibrating frame 3 essentially has only one degree of freedom, in the longitudinal direction of vibratory conveyor 1, i.e. perpendicular to the plane of the drawing in FIG. 3.

In addition, in FIG. 3 the outermost traverse 20, which is situated at the delivery end of vibrating conveyor 1 and is part of base frame 2, is visible. Further traverses 20, 30 are covered in FIG. 3 and are therefore not visible. Above traverse 20, mat 40, which forms conveyor trough 4 of vibratory conveyor 1, is visible. At the left and at the right is a respective raised edge 41 of mat 40. As FIG. 3 illustrates, traverse 20, as well as the further traverses 20, 30, support mat 40 both on its lower side and also externally at its raised edges 41.

Seen in the transverse direction of vibratory conveyor 1, traverse 20 has a height profile 22 having a centric raised part, which forms a distribution contour 42 in mat 40 and in conveyor trough 4, which contour here divides the stream of conveyed material on mat 40 into two lateral partial streams.

Finally, in the background of FIG. 3, supply-side supply chute 13 is also visible.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

| List of reference characters: | |
| --- | --- |
| Character | Designated part |
| 1 | vibratory conveyor |
| 11 | supply end |
| 12 | delivery end |
| 13 | supply chute |
| 14, 14' | connection points |
| 2 | base frame |
| 20 | first traverses on 2 |
| 22 | height profile on 20 |
| 23 | console |
| 3 | vibrating frame |
| 30 | second traverses on 3 |
| 31 | spring elements |
| 32 | height profile on 30 |
| 4 | conveyor trough |
| 40 | mat |
| 40.1, 40.2 | mat segments |
| 41 | raised edge of 40 |
| 42 | distribution contour in 40 |

| List of reference characters: | |
|---|---|
| Character | Designated part |
| 5, 5' | vibratory drive on 3, on 2 |
| 6 | installation surface for 1 |
| S | direction of vibration of 3 |
| F | conveying direction of 1 |

The invention claimed is:

1. A vibratory conveyor comprising:
a base frame,
a vibrating frame mounted on the base frame and capable of being set into vibratory movement relative to the base frame by a vibratory drive, and
a conveyor trough formed by a flexible continuous mat,
the flexible mat forming the conveyor trough being alternately connected to the base frame and to the vibrating frame at connection points that are at a distance from one another, seen in a longitudinal direction of the conveyor trough, a respective mat segment being situated between each two base frame and vibrating frame connection points adjacent to one another in the longitudinal direction of the conveyor trough,
the vibrating frame being configured to be set into a vibration relative to the base frame by the vibratory drive such that the respective mat segments adjacent to one another in the longitudinal direction of the conveyor trough are alternately tensioned and relaxed in a push-pull mode,
the connection points being situated on first and second traverses running transverse to the longitudinal direction of the conveyor trough at a distance from one another, and each of the first traverses being connected to the base frame and each of the second traverses being connected to the vibrating frame respectively, in alternating fashion,
wherein, at least one of the traverses running in a transverse direction of the conveyor trough has a centric height profile, pronounced in a height direction, that forms a distribution contour in the mat and in the conveyor trough that divides a stream of conveyed material on the mat into two laterally spaced partial streams.

2. The vibratory conveyor as recited in claim 1, wherein the vibrating frame is mounted to have vibratory movement relative to the base frame such that during the vibratory movement of the vibrating frame produced by the vibratory drive, a distance of the first and second traverses from one another changes periodically.

3. The vibratory conveyor as recited in claim 2, wherein the vibrating frame is mountable to have vibratory movement relative to the base frame such that during the vibratory movement of the vibrating frame produced by the vibratory drive, a periodic change in a height position of the first and second traverses relative to one another is superposed on the periodic change in distance of the first and second traverses from one another.

4. The vibratory conveyor as recited in claim 1, wherein the flexible mat forming the conveyor trough is made continuous over a plurality of the connection points.

5. The vibratory conveyor as recited in claim 1, wherein the flexible mat forming the conveyor trough is made continuous over all of the connection points.

6. The vibratory conveyor as recited in claim 1, wherein the mat segments of the flexible mat forming the conveyor trough are separate mat partial pieces that tightly abut one another and that each extend between two adjacent ones of the connection points.

7. The vibratory conveyor as recited in claim 1, wherein one of the traverses connected to the vibrating frame is situated at a supply end of the vibratory conveyor.

8. The vibratory conveyor as recited in claim 1, wherein the flexible mat forming the conveyor trough is bent upward at longitudinal edges of the flexible mat.

9. The vibratory conveyor as recited in claim 1, wherein the base frame is configured to have vibratory movement relative to an installation surface of the vibratory conveyor, and to be set into vibratory movement relative to the installation surface by the vibratory drive of the vibrating frame or by a separate vibratory drive.

10. The vibratory conveyor as recited in claim 1, wherein the vibratory drive is adjustable with respect to at least one of a frequency of vibration, a vibration amplitude or a direction of vibration.

11. The vibratory conveyor as recited in claim 1, wherein the flexible mat forming the conveyor trough is made of a plastic or rubber material that is non-adhesive or anti-adhesive with respect to the material to be conveyed.

* * * * *